Nov. 10, 1970   T. G. PARKER   3,539,481
ADHESIVE STICK
Filed June 17, 1968
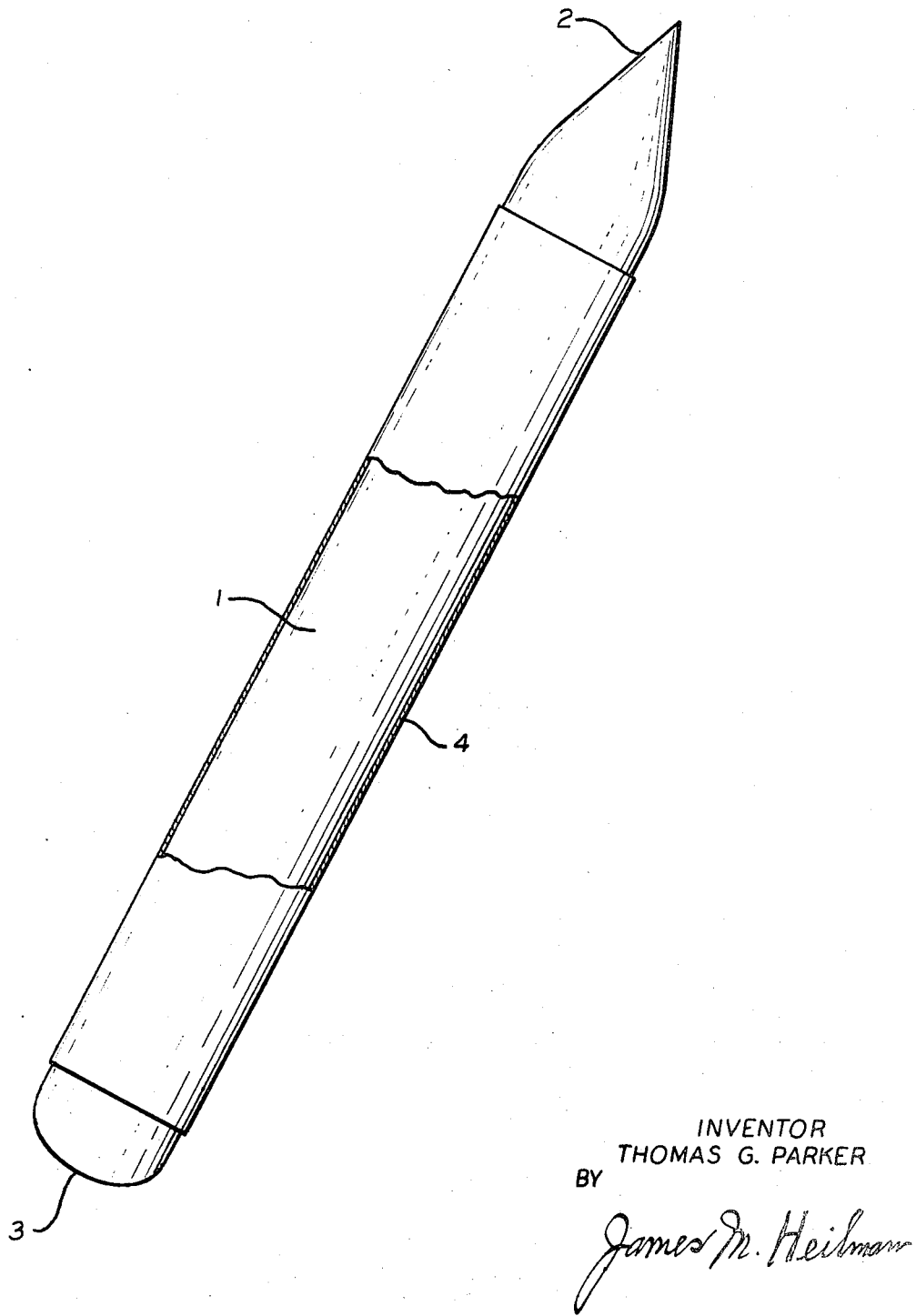
INVENTOR
THOMAS G. PARKER
BY
*James M. Heilman*
ATTORNEY.

United States Patent Office 3,539,481
Patented Nov. 10, 1970

3,539,481
ADHESIVE STICK
Thomas G. Parker, Three Rivers, Mich., assignor to U.S. Plywood-Champion Papers Inc., New York, N.Y., a corporation of New York
Filed June 17, 1968, Ser. No. 737,711
Int. Cl. C09j 3/26
U.S. Cl. 260—27
7 Claims

ABSTRACT OF THE DISCLOSURE

The present invention is concerned with a stick of adhesive or an adhesive stick, pencil, or rod having a novel composition whereby the softening of the adhesive for application is secured by the frictional rubbing of the end of the glue rod on the material or materials to be adhered, and followed by the setting or polymerization of the composition to secure excellent adhesion.

---

The present invention is concerned with a stick or rod of solid adhesive having a unique composition of various ingredients and of certain critical percentages which is molded, extruded, or otherwise formed so as to produce said solid stick of adhesive. When it is desired to utilize the adhesive, the necessary heat is imparted to the stick by rubbing it against one of the materials to be bonded and therefore inducing heat by frictional contact. The frictional heat will soften the adhesive composition so that it will be uniformly deposited on the materials to be bonded together.

The use of adhesives of various types is well known in the art. These adhesives usually come in the form of a liquid in a jar, a paste in a tube, or a dry powder in a can to be mixed with water or some other solvent. Normally, these adhesives are viscous at ambient room or factory temperatures. When they are applied to the material to be bonded, the solvent evaporates thus securing the adhesion desired.

The above conventional bonding adhesives, glues, and resins are a nuisance to use and difficult to obtain the proper proportions, particularly where a powdered urea formaldehyde resin, or a two-part resorcinal, or a two-part epoxy resin is used. Also these glues are awkward, especially with respect to children, since if they are dispensed in a tube, oozing results, or a jar may upset. Furthermore, exposure to the air by neglect, loss or misplacing of the cap or top results in solvent evaporation thus causing solidification and destruction of the adhesive. Thus the present invention is concerned with a solid adhesive stick or rod which may be handled as a pencil or pen, and left open to ambient room temperature conditions. When it is desired to soften and make the adhesive viscous, the stick is rubbed along the surface thereby creating the necessary friction and heat to soften the adhesive so that it may be readily and uniformly applied to the desired surface.

In general, the stick or rod may be of any desired length and thickness, and configuration as, for example, from about 4 inches long to 8 inches long, and have a diameter of from ¼ inch to ¾ inch and the like. In general, the physical characteristics of the stick should be: (a) an (ASTM D 127-49) melting point in the range from about 190° F. to 201° F., preferably in the range from about 194° F. to 197° F., such as 195.5° F.; (b) a penetration (ASTM D 1321) 100 g./5 sec. @ 77° F. in the range from about 16 to 20, preferably about 18; (c) a density in the range from about 0.9 g./ml. to 1.1 g./ml. such as about 0.974 g./ml.; (d) and a color of cream white.

The adhesive stick of the present invention comprises formulations as set forth in the following table.

TABLE I

| | Weight percent | | |
|---|---|---|---|
| | Range | Preferred | Desired |
| Amorphous polypropylene soft [1] | 25-40 | 28-35 | 33.8 |
| Amorphous polypropylene hard [2] | 2-10 | 4-7 | 5.0 |
| Rosin light color [3] | 3-13 | 6-10 | 8.0 |
| Vicinal glycol [4] | 2-10 | 4-7 | 5.0 |
| White ceresin wax [5] | 20-35 | 25-30 | 27.0 |
| Hard microcrystalline wax [6] | 12-20 | 15-17 | 16.0 |
| Hard wax (choice of 2) [7] | 1-7 | 3-5 | 5.0 |
| Antioxidant [8] | .05-0.5 | 0.1-0.3 | 0.2 |
| Total | | | 100.0 |

[1] Eastobond M-5:
  (a) Color—White
  (b) Softening point (ring and ball)—198° F. (ASTM E 28-51T)
  (c) Viscosity Brookfield—2,500-4,500 cp. at 375° F.
  (d) Penetration (hardness)—20 at 25° C. (ASTM D 5-52)
  (e) Molecular wt.—Approx. 24,000
  (f) Unaged tensile strength—49.7 p.s.i.
  (g) Aged 7 days at 100° C.—37.7 p.s.i.
  (h) Solids content—100%
  (i) Specific gravity—0.85
  (j) Flash point COC—540° F.
[2] Eastobond M-3:
  (a) Color—2.5 Gardner scale
  (b) Softening point (ring and ball)—208° F. (ASTM D 36-25)
  (c) Viscosity Brookfield—6,300 cp. at 275° F.
  (d) Penetration (hardness)—4.0 at 25° C. (ASTM D 1321)
  (e) Tensile strength—310 p.s.i.
  (f) Molecular weight—Approx. 7,000-8,000
  (g) Flash point COC—530° F.
  (h) Specific gravity—0.932
  (i) Blocking point—140° F.
[3] Acintol R type 3A:
  (a) Color French scale—3A (ASTM D 509-55)
  (b) Softening point (ring and ball)—76° C. (ASTM E 28-58T)
  (c) Acid No.—59 (ASTM D 465-59).
[4] Adol 158:
  (a) Color—White—25 APHA
  (b) Melt point—64° C.
  (c) Viscosity at 100° C.—0.3 stoke
  (d) Average molecular weight—260.5
  (e) Chain length—$C_{15}$-$C_{18}$ Cetyl-stearyl range
  (f) Iodine value—3.5
  (g) Acid value—0.09
  (h) Saponification value—2.0
  (i) Hydroxyl value—430
  (j) Specific gravity 60°/25° C.—0.8695
  (k) Flash point Cleveland open cup—190° C.
  (l) Molecular wt. distribution (gas chromatograph):

(a) Chain length                                  Percent
        $C_{13}$ ------------------------------------------- 0.9
        $C_{14}$ ------------------------------------------- 1.3
        $C_{15}$ ------------------------------------------- 30.0
        $C_{16}$ ------------------------------------------- 32.4
        $C_{17}$ ------------------------------------------- 23.2
        $C_{18}$ ------------------------------------------- 12.2

[5] White ceresin wax:
  (a) Color—White
  (b) Melt point—160-164° F. capillary tube method
  (c) Penetration (hardness)—10 at 25° C. (ASTM D 1321)
  (d) Acid No.—0
  (e) Saponification No.—2 max.
  (f) Specific gravity—0.880-0.935
  (g) Refractive index—1.425-1.435.
[6] Petrolite C 1035:
  (a) Color—1.5 (ASTM D 1500)
  (b) Melt point—195° F. (ASTM D 127-49)
  (c) Penetration (hardness)—3 at 25° C. (ASTM D 1321)
  (d) Acid No.—Nil
  (e) Saponification No.—Nil.
[7] Wax #1.—Durawax 1032 nontoxic (for softer stick):
  (a) Color—Light amber
  (b) Melt point—184-186° F. (ASTM D 127-49)
  (c) Penetration (hardness)—½-1 (ASTM D 1321)
  (d) Acid No.—1-2
  (e) Saponification No.—15-18.
Wax #2—U.S.A. pure refined carnauba type 2A (for harder stick):
  (a) Color—#3 yellow
  (b) Melt point—181.4° F. (ASTM D 127-49)
  (c) Penetration (hardness)—0 (ASTM D 1321)
  (d) Acid No.—2-6
  (e) Saponification No.—78-88
  (f) Flash point—590° F.
  (g) Volatile matter—Nil
  (h) Insoluble impurities—Nil.
Hardwax #3—U.S.A. pure refined carnauba #1 yellow (for lighter color):
  (a) Color—#1 yellow
  (b) Melt point—181.4° F. (ASTM D 127-49)
  (c) Penetration (hardness)—0 (ASTM D 1321)
  (d) Acid No.—2-6.
  (e) Saponification No.—78-88
  (f) Flash point—590° F.
  (g) Volatile matter—Nil
  (h) Insoluble impurities—Nil.
Antioxidant (butylated hydroxytoluene) Tenox BHT:
  (a) Appearance—White crystals
  (b Odor—Very slight
  (c) Molecular Wt.—220
  (d) Melting range—69-70° C.

With respect to the foregoing formulations the soft amorphous polypropylene functions as a primary adhesive, while the hard amorphous polypropylene acts as a hardener and modifier. The rosin functions as a tackifier for the primary adhesive and also to lengthen the open time on the film. The vicinal glycol acts as a lubricant and coupling agent while the ceresin wax functions as an application aid.

All the ingredients of the formulation are nontoxic and thus the adhesive stick may be used by children with complete safety.

With regard to the technique of application, the materials to be bonded together are placed preferably on some sort of a slight cushion. A cloth or several sheets of paper provide a satisfactory cushion and enhance the application of the glue. While paper is referred to throughout as the material to be glued together, it is understood that the term material is meant to include cloth, leather, fabrics, wood, and any other, preferably porous, materials.

The porous materials are held firmly in a manner to avoid wrinkling and tearing. The adhesive is then applied by holding the stick preferably at about a 45° angle and rotating or lightly rubbing the stick back and forth, with gradually increasing pressure as the stick warms and the end softens with friction. The stick is slightly rotated during application to expose a fresh edge continually which will greatly aid the application.

The application technique is continued until an even and substantial adhesive coating is deposited on the materials to be bonded. The coating should be distributed uniformly over as large an area as desired.

The areas to be bonded are aligned with glued areas together, and then rubbed with a finger which will permit possible realignment without damage to the materials. When correctly positioned, the bonded area is rubbed several times with the hard tip of the opposite end of the stick to set the bond permanently. The composition of the stick is designed to initially leave a soft film so that proper, more precise realignment is possible. The film will harden in a short time.

It is preferred that normally each item to be bonded will be rubbed or tacked with the glue stick for best bonding results. This is true particularly where one or both of the materials are not easily glued, such as wood, and particularly metal, glass, etc. However, it is understood that in many applications, only one of the sheets of paper, cloth, etc. need be rubbed with the adhesive stick.

One of the greatest uses of the stick of glue is in the office, home and schools where it may be left lying on the desk like a pencil and be immediately handy and ready for use. Instead of being in the shape of a pencil or stick, it may be in the shape of an elongated wedge or elongated tear drop and thus be unable to roll off of a school desk. Other and similar advantages, and equivalent compositions are readily apparent all within the scope of the above specifications and the following claims.

Referring to the figure: As mentioned above, the adhesive composition may be in any form as long as it can be easily handled, but an elongated rod in the shape of a stick, pencil, or crayon can be firmly held and conveniently handled. One or both ends may be shaped for easy application and may be pointed 2 or have a blunt or rounded end 3. If desired, a short or long wrapper 4 of paper or film or other material may be used.

The embodiments of the invention in which an exclusive property or privilege is claimed are defined as follows:

1. A solid frictional adhesive composition which consists essentially of about 25 to 40 wt. percent of an amorphous soft polypropylene having an A.S.T.M. penetration of about 20 at 25° C. and a molecular weight in the range from about 18,000 to 30,000, about 2 to 10 wt. percent of an amorphous hard polypropylene having an A.S.T.M. penetration of about 4.0 at 25° C. and a molecular weight in the range from about 5,000 to 10,000, about 3 to 13 wt. percent of a rosin, about 2 to 10 wt. percent of a vicinal glycol having a melting point in the range from about 60° to 70° C. and a molecular weight in the range from about 240 to 280, and about 33 to 62 wt. percent of a wax mixture, said wax mixture comprises about 20 to 35 wt. percent of a ceresin wax having a melting point in the range from about 150° to 170° F., about 12 to 20 wt. percent of a microcrystalline wax having a melting point in the range from 190 to 200° F., and about 1 to 7 wt. percent of a hard wax having a melting point in the range from about 180° to 190° F. and an A.S.T.M. penetration of from about ½ to 1.0, said solid composition being further characterized that when rubbed along a surface the frictional heat will soften said composition at the point of contact and said composition will be uniformly applied to said surface.

2. Adhesion composition as defined by claim 1 wherein said composition has a melting point in the range from about 190° to 201° F., a penetration in the range from about 16 to 20 and a density in the range from about 0.9 g./ml. to 1.0 g./ml.

3. A solid frictional adhesive composition having a melting point in the range from about 194° F. to 197° F. and a penetration (100 g./5 sec at 77° F.) in the range from about 16 to 20 which consists essentially of about 25 to 40 wt. percent of a soft polypropylene having a molecular weight in the range from about 18,000 to 30,000, a softening point in the range from about 194° F. to 204° F. and about 2 to 10 wt. percent of a hard polypropylene having a molecular weight in the range from about 5,000 to 10,000, a softening point in the range from about 205° F. to 211° F. and about 3 to 13 wt. percent of a rosin, about 2 to 10 wt. percent of a vicinal glycol having a melting point in the range from about 60° to 70° C. and a molecular weight in the range from about 240 to 280, and about 33 to 62 wt. percent of a wax mixture.

4. Adhesive composition as defined by claim 3 wherein said wax mixture comprises about 20 to 35 wt. percent of a ceresin wax having a melting point in the range from about 150° to 170° F., about 12 to 20 wt percent of a microcrystalline wax having a melting point in the range from 190° to 200° F. and about 1 to 7 wt. percent of a hard wax having a melting point in the range from about 180° to 190° F.

5. A solid frictional adhesive composition in the form of an elongated rod having a melting point in the range from about 194° F. to 197° F. and a penetration (100 g./5 sec at 77° F.) in the range from about 16 to 20 which comprises essentially about 34 wt. percent of a soft polypropylene having a molecular weight of about 24,000 and a softening point in the range from about 194° F. to 204° F., about 5 wt. percent of a hard polypropylene having a molecular weight of about 7,000 to 8,000 and a softening point of about 208° F., about 8 wt. percent of a rosin, about 5 wt. percent of a vicinal glycol having a melting point of about 64° C. and a molecular weight of about 260 and about 48 wt. percent of a wax mixture.

6. Adhesive composition as defined by claim 5 wherein said mixture comprises about 27 wt. percent of a ceresin wax having a melting point in the range from about 160° F. to 164° F., about 16 wt. percent of a microcrystalline wax having a melting point of about 195° F. and about 5 wt. percent of a hard wax having a melting point in the range from about 184° F. to 186° F.

7. Adhesive composition as defined by claim 6 wherein the composition is formed in the shape of an elongated rod approximately the following composition:

| | |
|---|---|
| Amorphous polypropylene soft | 33.8 |
| Amorphous polypropylene hard | 5.0 |
| Rosin light color | 8.0 |
| Vicinal glycol | 5.0 |
| White ceresin wax | 27.0 |
| Hard microcrystalline wax (penetration, A.S.T.M. 3 @ 25° C.) | 16.0 |
| Hard wax (choice of 2) (A.S.T.M. penetration ½ to 1.0) | 5.0 |
| Butylated hydroxy toluene | 0.2 |
| | 100.0 |

References Cited

UNITED STATES PATENTS

| | | | |
|---|---|---|---|
| 2,978,430 | 4/1961 | Thompson et al. | 260—31.8 |
| 3,051,670 | 8/1968 | Grantham | 260—27 |
| 3,220,966 | 11/1965 | Flanagan | 260—27 |
| 3,360,488 | 12/1967 | Hall et al. | 260—23 |
| 3,376,244 | 4/1968 | Rundle | 260—28.5 |
| 3,390,049 | 6/1968 | Rednick et al. | 260—27 |
| 3,271,340 | 9/1966 | Shegrer et al. | 260—897 |

DONALD E. CZAJA, Primary Examiner

W. E. PARKER, Assistant Examiner

U.S. Cl. X.R.

260—28.5, 33.6, 897